United States Patent [19]

Kameda et al.

[11] Patent Number: 4,924,426
[45] Date of Patent: May 8, 1990

[54] APPARATUS WITH SELECTION CIRCUITRY FOR DISTRIBUTING DATA BLOCKS FROM EXTERNAL MEMORY TO PROCESSING UNITS ACCORDING TO ATTRIBUTE DATA CONTAINED IN EACH DATA BLOCK

[75] Inventors: Keiichi Kameda; Kenichi Takahashi, both of Kyoto; Kouichi Horigami, Suita; Hiroyuki Iitsuka, Neyagawa, all of Japan

[73] Assignee: Matsushita Electric Industrial Co., Ltd., Osaka, Japan

[21] Appl. No.: 902,958

[22] Filed: Sep. 2, 1986

[30] Foreign Application Priority Data

Sep. 3, 1985 [JP] Japan ............................ 60-195225

[51] Int. Cl.$^5$ .......................... G06F 3/00; G06F 9/06; G06F 12/06; G06F 13/14
[52] U.S. Cl. ................................ 364/900; 364/927.92; 364/927.97; 364/929.3; 364/930.5; 364/931.1; 364/933.9; 364/939.3; 364/946.2; 364/957.1; 364/958.3; 364/964.8; 364/949.5; 364/968
[58] Field of Search ... 363/200 MS File,.900 MS File, 363/200, 900

[56] References Cited

U.S. PATENT DOCUMENTS 4,305,131 12/1981 Best .................................... 364/410
4,393,453 7/1983 Nakano ............................. 364/514
4,454,575 6/1984 Bushaw ............................. 364/200
4,456,957 6/1984 Schieltz ............................ 364/200
4,590,522 5/1986 Takemoto et al. ............... 360/32
4,642,789 2/1987 Lavelle ............................. 364/900

Primary Examiner—David Y. Eng
Assistant Examiner—Emily Y. Chan
Attorney, Agent, or Firm—Wenderoth, Lind & Ponack

[57] ABSTRACT

An information memory control system include: a memory unit having a memory medium for storing a plurality of information in the form of a plurality of data blocks each of which contains an information data and an attribute data of the information data; an access unit for accessing the memory unit so as to read out each of the data blocks from the memory medium; a selection unit directly coupled to the memory unit for distributing each of the read-out data blocks to a plurality of output ports of the selection unit according to the attribute data; a processing unit coupled to one of the output ports of the selection unit as so to correspond to the attribute data for processing the information data according to the attribute data; and an output device coupled to the processing unit for outputting the processed information data. A plurality of processing units can be respectively coupled to the plurality of output ports of the selection unit, and a plurality of output devices can be respectively coupled to the plurality of processing units.

2 Claims, 4 Drawing Sheets

APPARATUS WITH SELECTION CIRCUITRY FOR DISTRIBUTING DATA BLOCKS FROM EXTERNAL MEMORY TO PROCESSING UNITS ACCORDING TO ATTRIBUTE DATA CONTAINED IN EACH DATA BLOCK

BACKGROUND OF THE INVENTION

1. Field of the Invention

The present invention relates to an information memory control apparatus which is capable of storing, processing and controlling massive information having a wide variety of attributes and applicable to a variety of electronic publications including electronic catalogues, electronic dictionaries, electronic encyclopedia, etc.

2. Description of the Prior Arts

Recently, reflecting extensively promoted sale of personal computers (PC) in the market, digital processing of a variety of informations has become popular. Also, reflecting the significantly developed auxiliary memory devices, such as floppy disks which are now commercially available at inexpensive prices and optical disks which are now being produced on the commercial basis, the digital processing of a variety of informations has been effectively promoted.

Any of the conventional arts effectively uses limited data-storage area of the auxiliary memory devices under control of the operating system (OS) of computers including personal computers and miniaturized computers by effectively applying the directory structure of the floppy disks used for personal computers for example. Conventionally, any of those auxiliary memory devices is used for provisionally storing digital data. When applying any of those conventional auxiliary memory devices, the operating system merely controls identification of the digital data by putting file names to these data to identify whether each data is a character data composed by a word-processor unit, or a graphic data that should be displayed on a graphic display, or an audio data converted by an analog-digital converter for example, while all of these data are dealt by the operating system without discrimination. Conventionally, all of these data are processed by means of a system hardware which is controlled by microprocessor and a system software processed by an operating system and application programs.

On the other hand, commercial production of the optical disks has made it possible for each disk to store several giga-bytes of data. Typically, the debut of the optical disk has successfully paved the way for applying the disk to the media for storing pulse-code modulated audio data, or for storing character data, or for storing digital image data. This eventually results in the overall growth of the digital audio disks (DAD) represented by the compact disks (CD).

By effectively expanding data-storage capacity of those media mentioned above, modern technology has made it possible to collectively store massive information such as audio signals, characters, pictures, and/or computer software programs in a piece of storage medium.

Referring now to FIG. 6, conventional information memory control apparatuses will be described. Note that if an information had a certain property such as execution of a digital-analog conversion of audio information for example, this property is defined to be an "attribute" in the following description. FIG. 6 is a simplified block diagram of a conventional information memory control apparatus incorporating memory unit 41, data-processing unit 42, operation control unit 43, data-output unit 44, and external memory unit 45.

This external memory unit 45 stores a variety of informations including characters, pictures, and audio signals. These data are delivered from external memory unit 45 to data-output unit 44 in a sequential order shown below. First, data-processing unit 42 controlled by control unit 43 stores designated data from external memory unit 45 in memory unit 41. Next, in response to a command from control unit 43, data-processing unit 42 outputs those data from memory unit 41 to output unit 44. For example, if a character data is designated, a character display is selected as output unit 44, or if a picture data is designated, then a graphic display is selected, conversely, if an audio data is designated, a speaker is selected as output unit 44.

Assume that the conventional information memory control apparatus mentioned above merely transfers a data together with the destination address to the data processor by adding an address of this data processor to the designated data without processing the data itself, then the communication network system has a property which is similar to the above device. More particularly, the conventional information memory control apparatus transfers data from a certain memory device to an aimed data-processor by providing the designated data with addresses of the destination printer, display unit, or any other processors as the attributes so that the destination processor can eventually be allowed to output the designated data after executing necessary processes.

Referring now to FIG. 7, a typical constitution of the conventional communication network system will be described. FIG. 7 is a simplified block diagram showing an example of conventional communication network system incorporating terminal units 51, 52, and 53, switchboards 54, 55, and 56, an external memory device 57, and output units 58 and 59.

First, a consideration is given to the case in which a character data is delivered from external memory device 57 to terminal unit B 52 before displaying the data in a character display unit of output unit B 58. The character data is first provided with the destination address in the terminal unit A 51, where the address itself makes up the attribute of the designated character data. The address-added data is then delivered to the data. communication line via switchboard A 54. Next, switchboard B 55 identifies that the destination address is the attribute of the designated data corresponds to terminal unit B 52, and then delivers the character data to terminal unit B 52 together with the attribute. Terminal unit B 52 then converts the character data into a character signal and then causes the character signal to be displayed on the output device B 58. When displaying a picture data stored in the external memory device 57 in a graphic display unit of output device C 59 of terminal unit C 53, the picture data is first provided with an attribute whose destination address corresponds to terminal unit C 53, and then the addressed-added picture data is delivered to switchboard A 54 before eventually being displayed on the graphic display.

However, since the constitution of any conventional information memory control apparatus cannot directly select the destination of the data output from external memory unit 45 in response to the attribute of the output data, the memory control apparatus needs to provisionally store the output data in memory unit 41 before allowing data-processing unit 42 to identify the attribute of the output data by a hardware controlled by a microprocessor and a software comprised of an operating system and application programs. Then, the memory control apparatus executes the data processing operation in accordance with the attribute before eventually transmitting the processed data to output unit 44. Thus, in order to correctly deal with massive information, the conventional information memory control apparatus always needs to use a large-capacity memory unit 41, and yet, the apparatus should preliminarily know the information capacity. To properly process information having a variety of attributes, the conventional information memory control apparatus is obliged to use complex data-processing unit 42. Generally, the conventional information memory control apparatus cannot easily execute a real-time data processing operation. In particular, when dealing with audio information, due to the enormous amount of audio signals and continuity of the audio output signals, the conventional apparatus unavoidably faces those problems mentioned above. For example, when dealing with information matching 16-bit quantization, 2-channels, and 44.1 KHz of the sampling specification being exactly identical to those of the audio information stored in a compact disk, the information memory control apparatus needs to transfer information at a rate of 176 Kbytes/second. Obviously, the conventional apparatus needs to use a large- capacity memory unit 41 in order to transmit information to the D/A converter on the real-time basis using those conventional techniques mentioned above. Furthermore, when operating the conventional communication network system, information stored in the external memory device 57 is not provided with any attribute. To compensate for this, it is necessary for the system to compulsorily add the attribute inside of the terminal unit A 51. In other words, basically, the conventional communication network system unavoidably needs to add the attribute to information inside of the external memory device 57 by applying hardware and software inside of the terminal unit A 51.

In addition, basically, each terminal unit of the conventional communication network system makes up an independent data-processing unit, and thus, the system needs to set up a specific communication rule(protocol) for transmitting and receiving information between terminal units, which in turn unavoidably expands the size of the hardware at the part of the interfaces of terminal units. Furthermore, general-purpose utility is particularly urged for the communication network. On the other hand, the presence of the protocol itself causes the system to unavoidably execute sophisticated processes using both hardware and software in accordance with the established protocol in addition to the proper information processing such as the D/A conversion process inherently needed for processing audio signals for example. This is certainly a grave problem from the viewpoint of the actual need for directly transferring the designated data from memory device to a device corresponding to the attribute of the data.

SUMMARY OF THE INVENTION

A primary object of the present invention is to provide a useful information memory control apparatus incorporating means for optimumly processing an information read out from memory means in accordance with its own attribute.

An information memory control apparatus of the present invention comprises: a memory unit for storing a plurality of informations in the form of a plurality of data blocks each of which contains an information data and an attribute data of said information data; an unit for accessing said memory unit so as to read out each of said data blocks from said memory unit; a selection unit directly coupled to said memory unit for distributing each of said read-out data blocks to a plurality of output ports of said selection unit according to said attribute data; at least one processing unit each coupled to one of said output ports of said selection unit so as to correspond to said attribute data for processing said information data according to said attribute data; and an output unit coupled to said processing means for outputting said processed information data.

According to the constitution of the information memory control apparatus according to the present invention, since the selection unit directly distributes the information read out from the memory means together with the own attribute according to the attribute, it is possible for the information memory control apparatus to optimumly process each information in response to each attribute inherent to said each information.

Since the present invention allows an information to be stored in an external memory unit together with its own attribute, there is no need of adding the destination as its attribute, and instead, data from the external memory unit can directly be transmitted to optimum means for ideally processing the information according to its own attribute. As a result, the information memory control apparatus of the present invention dispenses with a large-capacity memory unit. In addition, the data-processing unit also dispenses with complicated processes because the needed information is stored in the external memory unit after being ideally processed so that the data-processing unit can easily process the preliminarily processed information. Concretely, the information memory control apparatus of the present invention does not belong to any of the conventional type system that executes complicated processing of data from the external memory unit in any conventional data-processing unit, but it is capable of storing those data which are complete with preliminary processing optimumly suited for respective data-processing unit by effectively applying the memory unit featuring massive capacity and inexpensive cost, and as a result, the constitution of the entire apparatus can be simplified being ideally suited for processing output data. The information memory control apparatus of the present invention dispenses with any of protocols when transmitting data otherwise needed for conventional communication network systems.

In addition, the present invention allows interfaces of respective unit to significantly save the hardware.

In addition, since the information memory control apparatus of the present invention uses such a memory unit that stores informations together with their attribute and continuously outputs the information at specific intervals on the time axis, the system can effectively deal with an extremely large amount of informations requiring real-time processing. Furthermore, the information memory control apparatus stores audio information and uses the D/A converter for processing it. This allows the system to effectively output the audio information for a long time on the real-time basis.

In addition, the apparatus of the present invention records a variety of informations being different from each other in a plurality of channels. This allows the system to output either characters or pictures simultaneously with the output of audio information. The memory unit stores all management information governing respective units of the information memory control apparatus of the invention. This allows the system to realize a variety of information memory control apparatuses by merely replacing the recording media that function as the memory unit.

The above-mentioned and other objects, features, and advantages of the present invention will become more apparent from the following description taken in conjunction with the accompanying drawings in which:

DESCRIPTION OF THE PREFERRED EMBODIMENT

Figure 1:
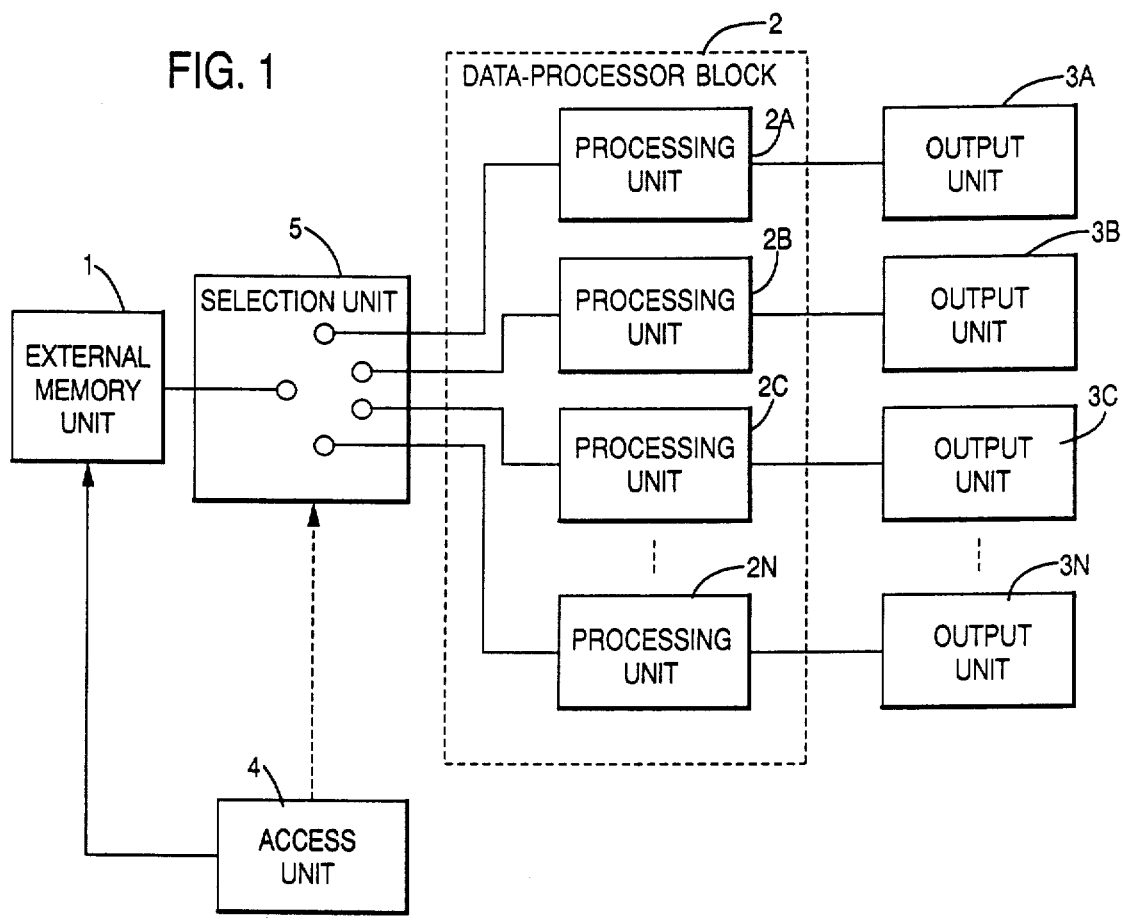
FIG. 1 is a simplified block diagram showing an overall constitution of an information memory control apparatus according to the present invention.
Figure 2:
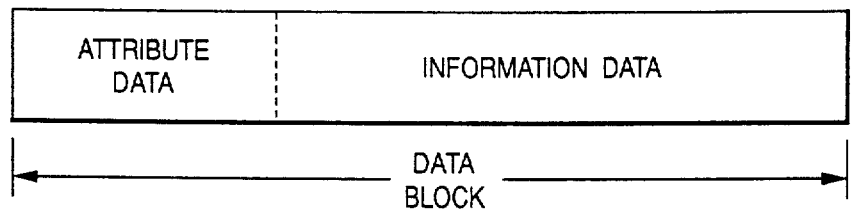
FIG. 2 is a constitution of a data block stored in memory unit shown in FIG. 1.

Referring now to FIGS. 1 and 2 a preferred embodiment of the present invention will be described below. In addition, referring more particularly to FIGS. 3, 4 and 5, a concrete example of the above preferred embodiment is described in the next section.

FIG. 1 is a simplified block diagram showing an overall constitution of the information memory control apparatus reflecting a preferred embodiment of the present invention, where the apparatus is comprised of an external memory unit 1, a data-processor block 2 including various data-processing units 2A, 2B, 2C through 2N, data-output units 3A, 3B, 3C through 3N which respectively deal with data from data-processing units 2A, 2B, 2C through 2N, an access unit 4, and a selection unit 5 having a plurality of output ports which are respectively connected to the data-processing units 2A through 2N. The combination of information data and its attribute data shown in FIG. 2 is defined to be a data block in the following description.

Next, operations of the information memory control apparatus according to the present invention will be described below. First, access unit 4 accesses the data block containing information data and its attribute data shown in FIG. 2 before delivery to selection unit 5. Selection unit 5 then identifies the attribute of the received data block and then delivers the data block to one of data-processing units 1 through N in accordance with the identified attribute. The data block distributing process, can also be added to original function of access unit 4. The distributed data block is then subjected to processing operations of data-processing units 1 through N in accordance with its own attribute before being delivered to each of output units 1 through N.

According to the preferred embodiment mentioned above, a data block can properly be processed in accordance with its own attribute by allowing external memory unit 1 to store the information data together with its attribute data. Referring now to a concrete example of this preferred embodiment, function of the information memory control apparatus of the present invention will be described in detail below. The following description refers to a novel information memory control apparatus reflecting a preferred embodiment realizing an electronic catalogue system using compact disks as the external memory unit shown in FIG. 1 storing a variety of data including characters, pictures, and audio information together with the attributes of data themselves and also using a compact-disk player capable of continuously outputting the needed data from compact disks at specific intervals on the time-axis.

Figure 3:
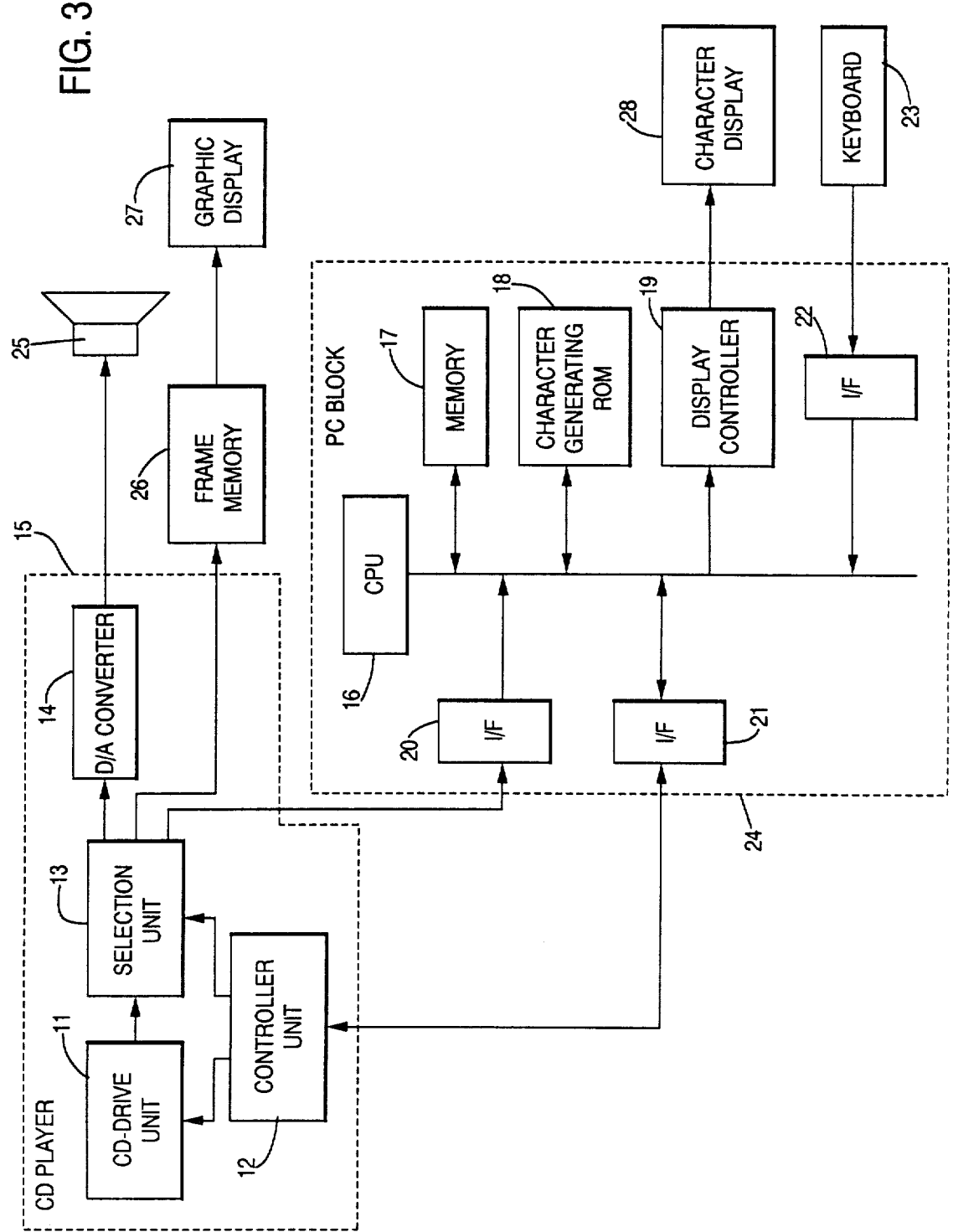
FIG. 3 is a simplified block diagram showing a constitution of an information memory control apparatus reflecting a preferred embodiment of the present invention.
Figure 5:
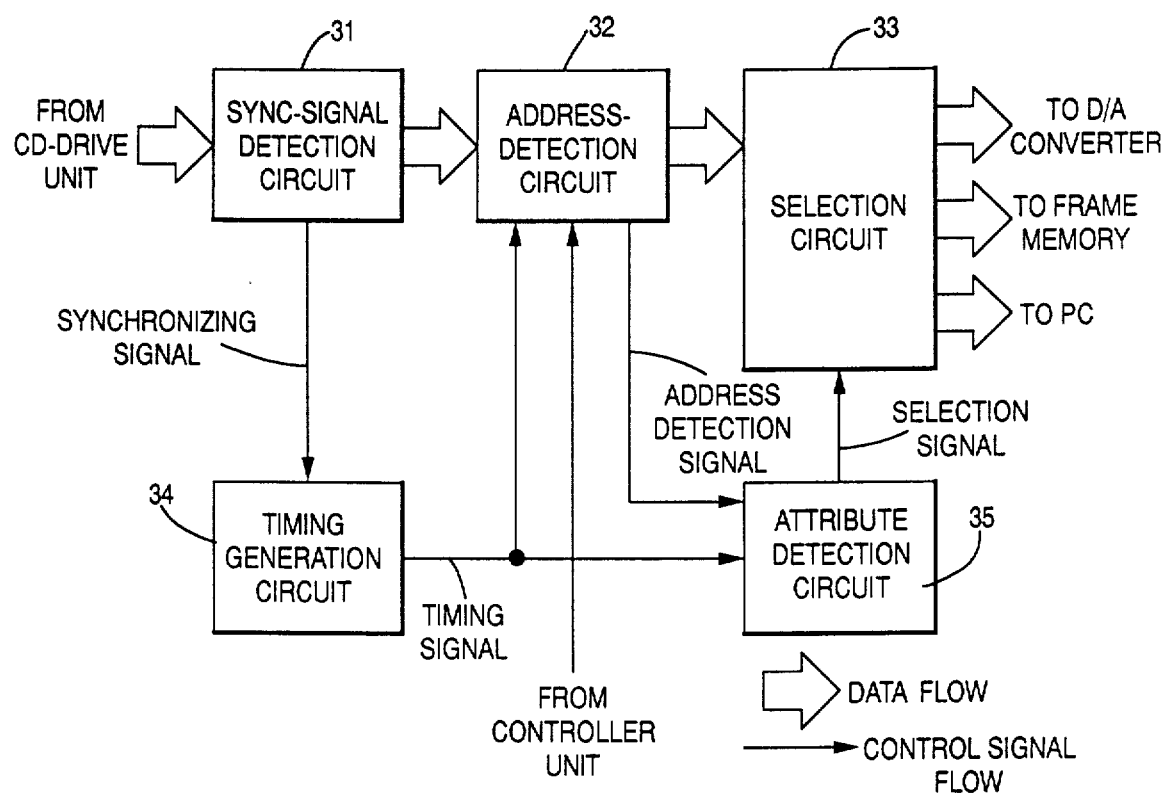
FIG. 5 is a simplified block diagram showing a constitution of selection device shown in FIG. 3.
Figure 6:
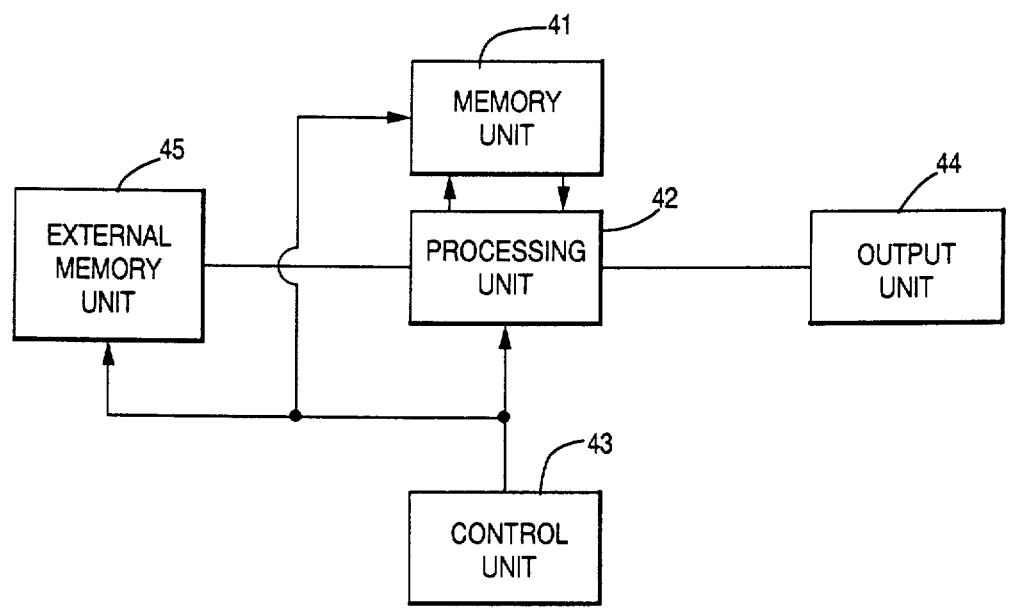
FIG. 6 is a simplified block diagram of one of the conventional information memory control apparatuses.
Figure 7:
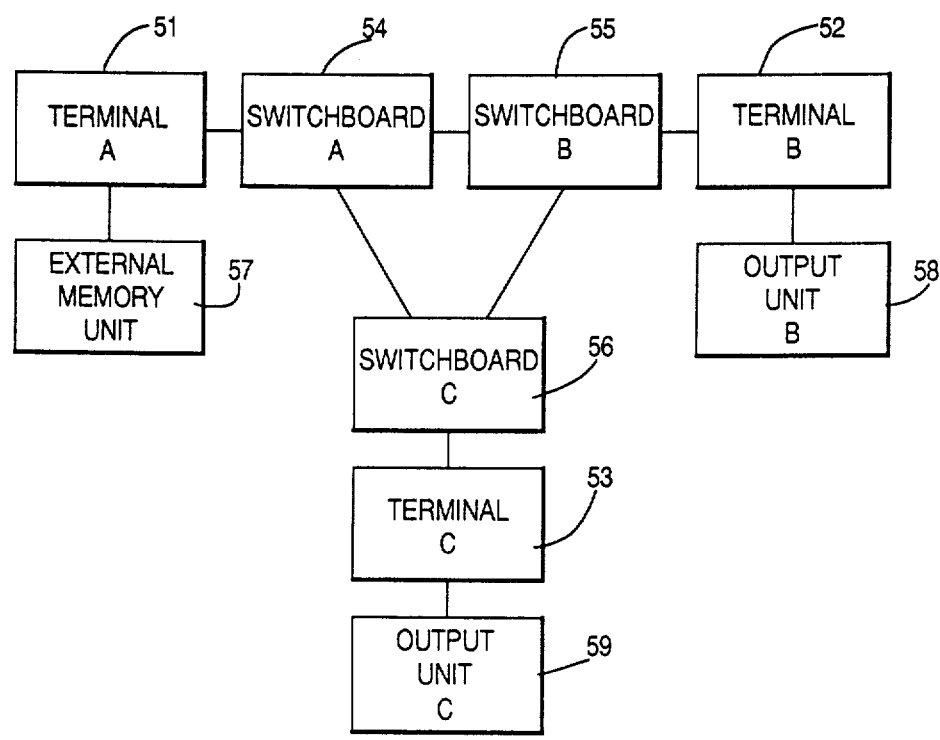
FIG. 7 is a simplified block diagram showing an example of conventional communication network system.

FIG. 3 is a simplified block diagram of the information memory control apparatus reflecting the preferred embodiment of the present invention, in which block 15 is comprised of a CD-drive unit 11, a controller unit 12, a selection unit 13, and a D/A converter 14 functioning as an audio information processing unit, while block 15 itself substantially makes up a compact-disk player that reproduces all the data recorded in the compact disk which functions as, the memory unit. Block 24 which is a PC functioning as the access unit together with a data-entry keyboard 23 and comprised of a CPU 16, a memory 17, a character generating ROM 18, a display controller 19, and interfaces 20 through 22, respectively. The information memory control apparatus of the present invention also incorporates a speaker unit 25 that outputs audio information, a frame memory 26 which processes picture information, a graphic display 27 which outputs graphic information, and a character display 28 which outputs character information. FIG. 5 is a simplified block diagram showing an internal constitution of selection unit 13 which incorporates a synchronizing(sync)-signal detection circuit 31, an address-detection circuit 32, a selection circuit 33, a timing-generation circuit 34, and an attribute-detection circuit 35, respectively.

Figure 4:
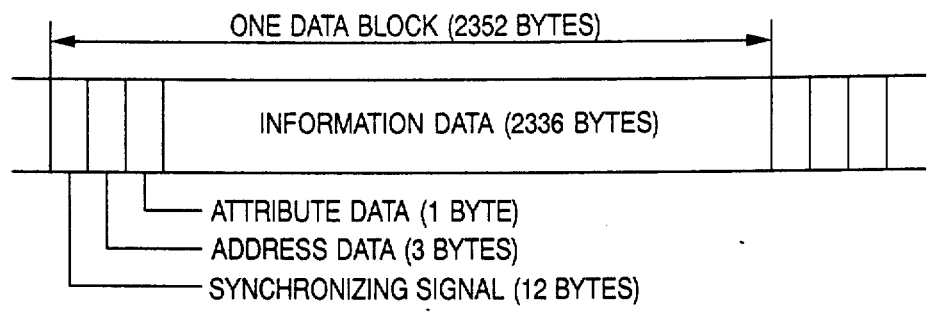
FIG. 4 is a constitution of a data block stored in memory media reflecting a preferred embodiment of the present invention.

Next, operations of the information memory control apparatus having the constitution mentioned above will be described below. Assume that, of those information related to character, picture, and audio, at least one of them is recorded in a compact disk for each product shown in the catalogues, and in addition, the compact disk also stores addresses of the product information, data size, classification information of each product, for example, management information including kinds, prices, and functions, as shown in FIG. 4. FIG. 4 shows a constitution of a data block which is comprised of a 12-byte synchronizing signal designating the start-up of the data set, a 3-byte address data designating the data-recorded position, a 1-byte attribute-data identifying these accompanying data, and 2336-byte information data, thus making up a block totalling 2352 bytes of data. A plurality of data blocks each having the above construction are recorded on a compact disk. Since the length of each data block is set so that it is identical to the minimum accessing unit of a conventional music-playing CD player, it is possible for any conventional CD player to easily access a specific data block. 3-bytes of the address signal deals with "minute", "second", and the data-block number. The attribute-data is made up by setting a specific bit of the 8-bits of one byte of those information related to character, picture, audio, and management.

Next, operation of the CD player 15 will be described below. Normally, any conventional music-playing CD player is comprised of the CD-drive unit 11, controller unit 12 which is mostly comprised of a microcomputer, and the D/A converter 14. Using these, music is output. In order to output information other than audio signals, the information memory control apparatus reflecting the preferred embodiment adds selection unit 13 to the position in front of the D/A converter 14.

Referring now to FIG. 5, function of selection unit 13 will be described below. The data block output from the compact disk as of the state shown in FIG. 4 is led to sync-signal detection circuit 31 for detecting the synchronizing signal. As soon as the synchronizing signal is detected, timing-generation circuit 34 is reset to start up its operation for feeding timing signals to respective component circuits. Next, address-detection circuit 32 checks to see that the address of the designated data block exactly matches the address sent from the controller unit before transmitting the needed data block to the following circuit. Attribute-detection circuit 35 identifies the kinds of information, i.e., any of the character, picture, audio, and management information, and outputs a selection signal corresponding to the identified kind of information. Selection circuit 33 sends a data block transmitted from the address detection circuit 32 to a corresponding one of the D/A converter, frame memory and PC according to the selection signal. In this preferred embodiment, an audio information is sent to D/A converter 14, a picture information is sent to frame memory 26, character and management information ar respectively sent through interface 20 to PC block 24. Operation of the controller unit is directly controlled by PC block 24 via interface 21.

Memory 17 of PC block 24 stores the system control information (programs). The following description refers to a process in which, after activating execution of programs in PC 24, the CPU 16 causes the initially-selected information to be displayed on the character display 28 by operating character generating ROM 18 and display controller 19. In accordance with the initially selected information, commands instructing the ensuing process are input via keyboard 23. Then, in accordance with the input command information, PC 24 causes the second-selected information to be displayed on the character display 28. In the same manner, the information memory control apparatus of the preferred embodiment sequentially reproduces final product information from the compact disk before eventually outputting at least one of those desired information related to character, picture, or audio.

Next, operation of the information memory control apparatus functioning as an electronic catalogue will be described below. Generally, attributes of catalogue book information are divided into character, picture, table, and index. Assume that a compact disk stores information having attributes of character, picture, and audio in conjunction with a complete product or a component part. In addition to memory addresses of respective product informations, the compact disk also stores management information related to the classifications of the product kinds, performances, and prices for featuring respective products. For example, assume that the product kinds are classified into (A), (B) and (C), performances are classified into 2 groups and 3 kinds, i.e., (a1), (a2), (a3), and (b1), (b2), (b3), and prices are classified into (I), (II), and (III), respectively.

First, in reference to the initially selected picture information shown on the character display 28, the product kind classification (A) that correctly matches the desired product is input via keyboard 23. Next, based on the secondly selected picture information, the performance classifications (a1) and (b1) that correctly match the desired product are input via keyboard 23. finally, based on the thirdly selected picture information, the price classification (I) is input via keyboard 23. As soon a these data are input, PC 24 picks up the management information stored in a compact disk via interface 20 and then gains access to the information address of a specific product that fully satisfies the designated product kind (A), performance classifications (a1) and (b1), and the price classification (I). After correctly picking up the product information address of the desired product and in reference to this address information, PC 24 then controls the controller unit 12 of the CD-player 15 via interface 21 to allow the address information to be eventually output from the CD drive unit 11. Then, as described before, selection unit 13 selects the destination of these data in accordance with their own attributes. Audio information is output from speaker unit 25 via the D/A converter 14. Picture information stored in frame memory 26 is output to the graphic display 27. Character information is delivered to PC 24 via interface 20, and then the CPU 16 reads the program stored in memory 17 before eventually allowing character information to be output to the character display 28 via character generating ROM 18 and the display controller 19.

As is clear from the foregoing description, the preferred embodiment of the information memory control apparatus according to the present invention optimumly executes the data processing operation by directly transmitting data from the compact disk functioning as the memory unit by effectively referring to the attributes of character, picture, and audio signals. In particular, the information memory control apparatus according to the present invention securely outputs audio information on the real-time basis.

Although both the compact disk and the CD-player 15 are made available for the memory unit in FIG. 3, it should be understood, however, that the present invention does not define the constituents of the memory unit to be merely comprised of the compact disk and the CD-player, but any device which can securely store digital information together with its own attribute and output audio information on the real-time basis may also be used as the memory unit. For example, digital audio tape (DAT) and the digital audio tape player are also effectively used as the memory unit.

Likewise, the preferred embodiment of the information memory control apparatus uses a personal computer (PC) 24 as the access unit capable of controlling the memory unit of FIG. 3. This may also be substituted by any unit which is capable of correctly controlling the memory unit. Although the preferred embodiment uses keyboard 23 as the data-input units, any substitutive device such as tablet, touch-panel, joy-stick, and the like may also be used as the data-input unit.

In addition, the preferred embodiment uses character display, graphic display, and speaker unit for the information output unit. The present invention however does not define the scope of the output unit to be merely inclusive of these. For example, a printer can also be used for making up by the unit for outputting character and image information.

A variety of recorders may also be used for outputting audio information as well. In the foregoing description, the information memory control apparatus is effectively used for an electronic catalogue device. Needless to say that the information memory control apparatus of the present invention can also effectively make up a variety of electronic publications including electronic dictionaries and an electronic encyclopedia for example.

What is claimed is:

1. An information memory control apparatus comprising:
    a memory means for storing therein a plurality of information in the form of a plurality of data blocks each containing an information data and an attribute data, wherein said attribute data represents at least a destination to which said information data is to be sent, and wherein each of said plurality of data blocks further contains a synchronizing signal located at the beginning thereof for indicating the beginning position of each data block and an address data indicating an address of the data block in said memory means;
    an access means for causing said memory means to read out each of said data blocks from said memory means;
    a selection means directly coupled to said memory means for receiving each data block read out from said memory means and for detecting the attribute data contained in each received data block and for sending each received data block to one of a plurality of output ports of said selection means according to the detected attribute data, said selection means including: a synchronizing signal detecting means for detecting said synchronizing signal; and an address detecting means for detecting said address data and for determining whether or not the detected address data is a desired address data when said synchronizing signal detecting means has detected said synchronizing signal;
    at least one processing means coupled to a corresponding output port of said selection means for processing said information data of a data block sent to said corresponding output port coupled thereto according to said attribute data; and
    an output means coupled to said processing means for outputting the processed information data.

2. An information memory control apparatus comprising:
    a memory means for storing therein a plurality of information in the form of a plurality of data blocks each containing an information data and an attribute data, wherein said attribute data represents at least a destination to which said information data is to be sent, and wherein said plurality of data blocks contain, as said information data, at least one of character information data representing a character as coded data, image information data and audio information data, wherein each data block containing said audio information data contains, in said attribute data, information representing at least one of the number of quantization bits and sampling frequency of said audio information data;
    an access means for causing said memory means to read out each of said data blocks from said memory means;
    a selection means directly coupled to said memory means for receiving each data block read out from said memory means and for detecting the attribute data contained in each received data block and for sending each received data block to one of a plurality of output ports of said selection means according to the detected attribute data;
    at least one processing means coupled to a corresponding output port of said selection means for processing information data of a data block sent to said corresponding output port coupled thereto according to said attribute data, said processing means comprising at least one of: a character information processing means for converting said character information data to character data of a predetermined format; an image information processing means for converting said image information data to image data of a predetermined format; and an audio information processing means for converting said audio information data to an analog audio signal, wherein said audio information processing means comprises a digital-to-analog converter at least one of whose number of bits and sampling frequency is set by said information in said attribute data contained in each data block containing said audio information data; and
    an output means coupled to said processing means for outputting the processed information data, said output means comprising at least one of: a character output means coupled to said character information processing means for outputting said character data as a visible character image; an image output means coupled to said image information processing means for outputting said image data as a visible image; and an audio output means coupled to said audio information processing means for outputting said analog audio signal as a sound.

* * * * *